United States Patent [19]
Chapas et al.

[11] Patent Number: 5,384,005
[45] Date of Patent: Jan. 24, 1995

[54] PROCESS FOR PRODUCING LAMINATED CAPACITORS AND CAPACITOR MADE FROM SUCH A PROCESS

[75] Inventors: Nicolas Chapas, Navenne; Philippe Mysson, Fontaine Francaise; Ronan Stephan, Dijon, all of France

[73] Assignee: Compagnie Europeenne de Composants Electroniques LCC, Courbevoie, France

[21] Appl. No.: 183,236

[22] Filed: Jan. 19, 1994

Related U.S. Application Data

[63] Continuation of Ser. No. 22,313, Feb. 19, 1993, abandoned.

[30] Foreign Application Priority Data

Feb. 25, 1992 [FR] France ................................. 92 02150

[51] Int. Cl.⁶ ........................... B44C 1/22; C23F 1/00
[52] U.S. Cl. .................................... 156/629; 156/634; 156/643; 156/644; 156/651; 156/656; 219/121.69
[58] Field of Search ............... 156/629, 630, 634, 643, 156/644, 650, 651, 656, 190, 191, 192, 272.8; 219/121.68, 121.69

[56] References Cited
U.S. PATENT DOCUMENTS 4,685,197  11/1987  Tigelaar et al. ................. 156/634 X
4,700,457  10/1987  Matsukawa .................... 156/634 X

FOREIGN PATENT DOCUMENTS 0200089  12/1986  European Pat. Off. .
3300041   7/1984  Germany .
2143087   1/1985  United Kingdom .

*Primary Examiner*—William Powell
*Attorney, Agent, or Firm*—Oblon, Spivak, McClelland, Maier & Neustadt

[57] ABSTRACT

A process for producing laminated capacitors includes stacking of metallized plastic films. It includes a step of winding of at least one pair of metallized plastic films, this step being separated into three phases, a first phase of making finishing turns and during which the films are demetallized so that their superposition does not lead to any additional capacitance in the final component, a second phase of superposing the films so that they contribute to the capacitance of the final component and during which the films are demetallized near their edges, and a third phase intended to perform finishing turns under the same conditions as during the first phase, wherein the demetallizations of the films occurring in the successive phases are performed by etching. The process for producing laminated capacitors can also include at least one step of demetallization of metallized plastic films appearing in the form of widths of great width intended to be cut into elementary ribbons, in which the demetallization is performed by etching.

8 Claims, 4 Drawing Sheets

PROCESS FOR PRODUCING LAMINATED CAPACITORS AND CAPACITOR MADE FROM SUCH A PROCESS

This application is a continuation of application Ser. No. 08/022,313, filed on Feb. 25, 1993, now abandoned.

BACKGROUND OF THE INVENTION

1. Field of the Invention

This invention relates to a process for producing a laminated capacitor made by stacks of metallized plastic films as well as the capacitor obtained by such a process.

2. Description of the Related Art

One of the steps of a known process consists in winding on a large diameter wheel at least one pair of metallized plastic films. Each metallized plastic film is in the form of a ribbon resulting from the cutting of a width of metallized plastic film of great width. During this winding phase, a nonmetallized lateral portion is formed on each of the two films of the pair. The nonmetallized lateral portions are made on opposite sides to obtain alternating layers of films consisting of an even row film and an odd row film.

Thus, a capacitive ribbon is obtained that has alternate even and odd row layers, called a mother capacitor. Each of the sides of the capacitive ribbon is then covered with a metal or an alloy to form terminals. Each terminal (output plate) makes it possible to mechanically and electrically connect the metallizations of the layers of the same row to one another. This operation, performed by spraying molten metal, is known as shooping. To improve the mechanical anchoring of the molten drops on the films of the same row, it is recommended to offset the even row films in relation to the odd row films.

The capacitive ribbon is then cut into elementary units. Each such unit constitutes a laminated capacitor of generally parallelepiped shape comprising six faces: two faces constituting the plates, two cutting faces and two faces perpendicular to both the plates and the cutting faces. To protect the two faces perpendicular to the plates and to the cutting faces, several solutions are known to a person skilled in the art. One of them consists of performing finishing turns at the beginning and at the end of the winding phase. The films are demetallized locally so that their winding does not present any capacitive effect on the final component.

The pulsed laser that is used to make the nonmetallized edges, whose width and positioning make it possible to define the capacitance of the capacitor, is generally also used for the local demetallization performed during the making of the finishing turns.

Conventionally, this laser acts by the spot thermal effect. It is necessary to modify the adjustment of the laser depending on whether it is desired to make nonmetallized side portions or perform said local demetallization.

The local demetallization is performed at the beginning and at the end of the winding phase, i.e., with a speed of winding of the metallized plastic films that is less than the established operating speed. Thus, unless either the frequency or the width of the pulses emitted by the laser, or the energy transmitted, is reduced, there is deterioration and burning of the plastic films.

This modification of the adjustment parameters of the laser results in interrupting its operation two times, a first time at the beginning of winding and a second time at the end of winding.

The production process is burdened by these various manipulations.

On the other hand, the laser beam, acting in a significant way by thermal effect, causes in every case a heating of the plastic films. This heating results in a local deterioration of dielectric rigidity as well as the voltage capacity of the capacitor. It can also be a source of deformations of the films and, therefore, lead to coiling problems.

Another drawback of the demetallization process using the thermal effect according to the prior art is the persistent presence of residual metallizations resulting mainly from remelting in the zones supposed to have been demetallized.

SUMMARY OF THE INVENTION

It is an object of the present invention to provide a process for producing laminated capacitors without the above drawbacks.

The process according to the invention comprises winding at least one pair of metallized plastic films, said winding being separated into three steps, a first step of performing finishing turns and during which the films are demetallized so that their superposition does not lead to any capacitance in the final component, a second step of superposing the films so that they contribute to the capacitance of the final component and during which the films are demetallized at lateral portions, and a third step intended to form finishing turns under the same conditions as during the first step, wherein the demetallizations of the films occurring in the successive steps are performed by etching.

An advantage of the invention is therefore to simplify the process for producing laminated capacitors.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In all the figures the same references designate the same elements.

Figure 1:
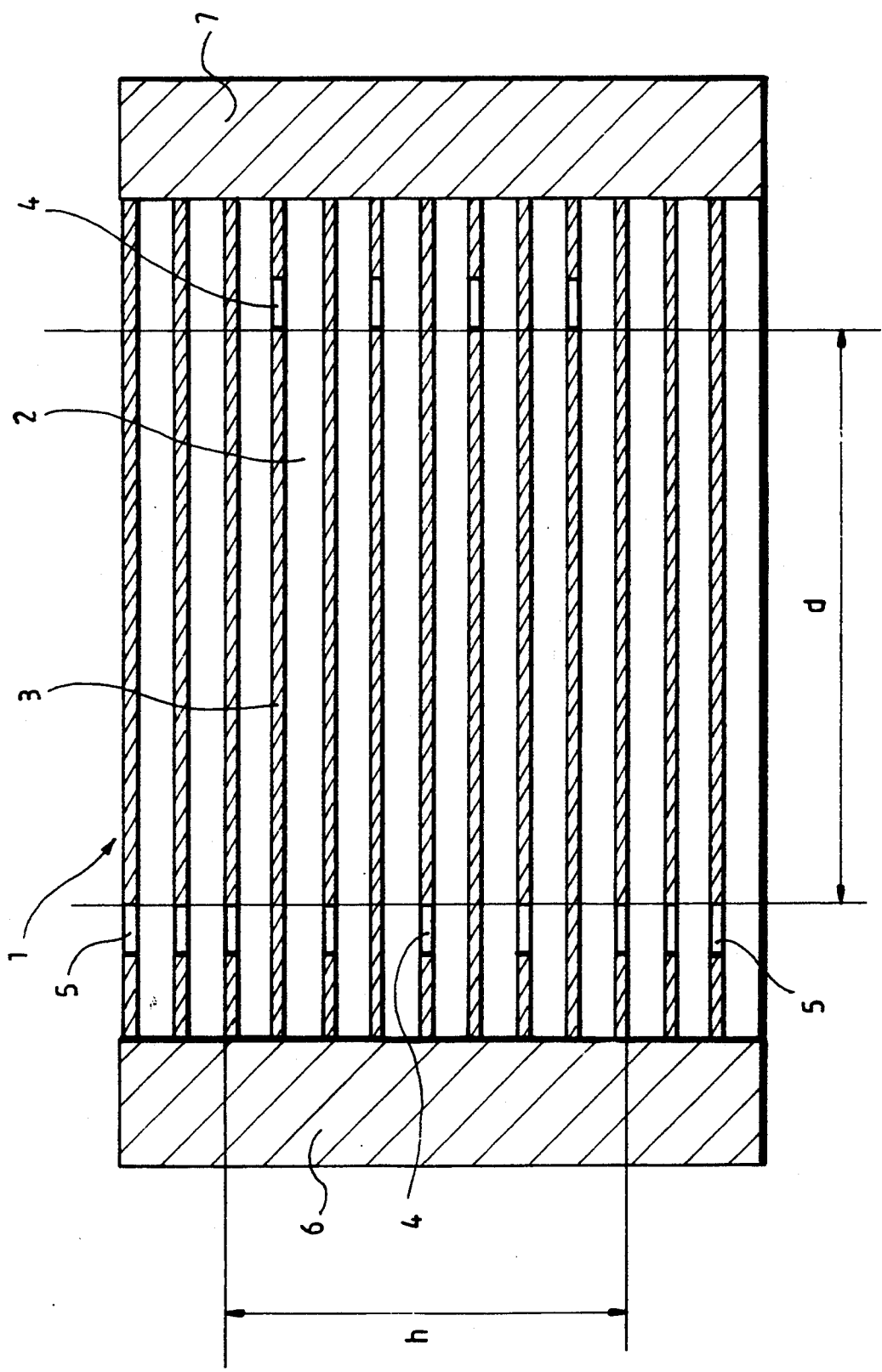
FIG. 1 is a view in section of a laminated capacitor having a stack of leaves of metallized plastic films which define its capacitance, framed by two stacks that exhibit no capacitive effect.

FIG. 1 is a view in section of a laminated capacitor whose stack of leaves of metallized plastic films which defines its capacitance is framed by two stacks that exhibit no capacitive effect.

Capacitor 1 consists of a wound stack of metallized plastic films. Within height h of the stack, each plastic film consists of a dielectric support 2 on which a metallization 3 is deposited. A nonmetallized lateral portion 4 separates metallization 3 into two zones electrically insulated from one another. One zone is connected to plate 6 and the other to plate 7. Nonmetallized lateral portions 4 of adjacent films are located in the vicinity of alternating plates, thus contributing to the capacitance of the capacitor over distance d.

On both sides of the stack of height h are located two stacks of metallized plastic films that do not exhibit any capacitive effect on the final component. As before, each plastic film consists of a dielectric support 2 on which a metallization 3 is deposited. A nonmetallized lateral portion 5 separates metallization 3 of these films into two zones electrically insulated from one another.

Nonmetallized portions 5 are located over one another, so that their films do not contribute to the capacitance of the capacitor. According to the preferred embodiment, nonmetallized portions 5 are positioned laterally. Any other position located between the two plates 6 and 7 is, of course, possible. Dielectric support 2 is a film of polyester, polycarbonate, polysulfone, polypropylene or the like, and metallization 3 is made with a metal selected from aluminum, zinc, alloys containing aluminum, zinc, chrome or the like.

Figure 2:
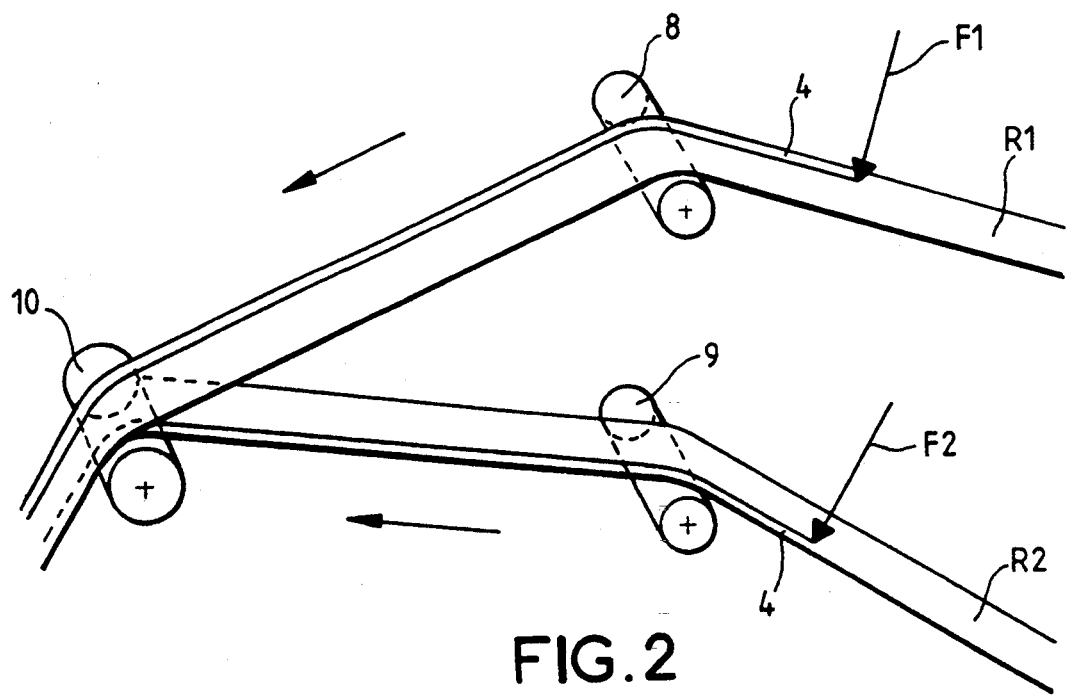
FIG. 2 shows the operation of making the nonmetallized portions on a pair of metallized plastic films during the step of winding of the films, according to the preferred embodiment of the invention.

FIG. 2 shows the operation of making nonmetallized portion on a pair of metallized plastic films during the stage of winding of the films, according to the preferred embodiment of the invention.

A first metallized plastic film, cut in the form of ribbon R1, is superposed on a second metallized plastic film, cut in the form of ribbon R2, via the system of rollers 8, 9, 10.

A laser beam F1, coming from a laser device not shown in the figure, forms a demetallized portion 4 on ribbon R1 while a laser beam F2, coming from the same laser device, makes a demetallized lateral portion 4 on ribbon R2.

Any type of device known to a person skilled in the art and making it possible to generate two different laser beams F1 and F2 from the same laser device can be used according to the invention. It is possible, for example, to use a device having two mirrors, one of which is semi-reflecting. According to the invention, the laser produces pulses of short duration (typically 15 nanoseconds for a metallization thickness on the order of 50 to 100 nm).

The demetallization is produced by a shock wave: The energy is applied for such a very short time that there is no thermal expansion of the material. A sudden rise in pressure of the material results. The effect of this shock wave on the material causes the peeling, then the ejection, of the surface layer and therefore the etching of the substrate.

Figure 3:
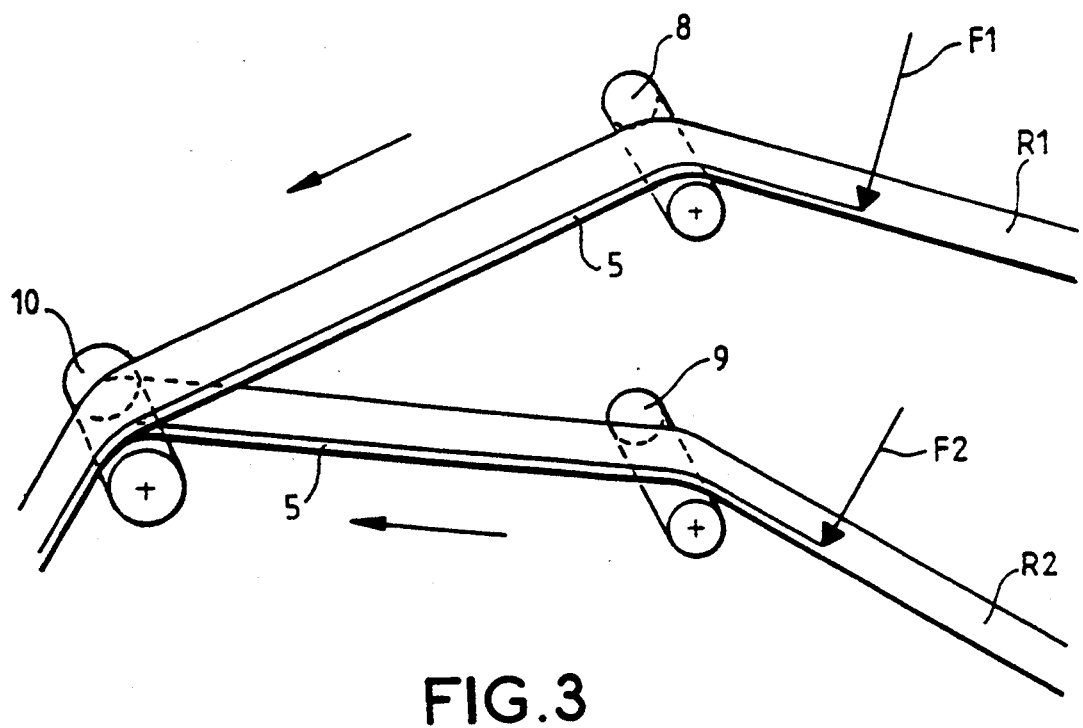
FIG. 3 shows the local demetallization operation performed during the finishing turns at the beginning and at the end of the winding step, according to the preferred embodiment of the invention.

FIG. 3 shows the local demetallization operation intended to form the turns at the beginning and at the end of the winding step, according to the preferred embodiment of the invention.

The operation is intended to make local demetallization portions 5 on the ribbons of plastic films R1 and R2 and uses the same elements as the previously described operation.

The only difference is reflected in the necessity to superpose the demetallized zones of the two plastic films. Thus, for example, laser beam F2 is displaced so as to produce this superposition condition.

The etching effect applied, according to the invention, to the demetallization of the metallized plastic films makes it possible to make finer demetallized portions than in the prior art. Thus it is possible to attain such portions with a width on the order of 3/100 of a millimeter and with a precision on the order of several microns, thereby contributing to the miniaturization of the components.

The etching effect can also be obtained using an electron beam using a network of field-effect micropoint cathodes comprising a large number of points with dimensions close to a micron.

Figure 4:
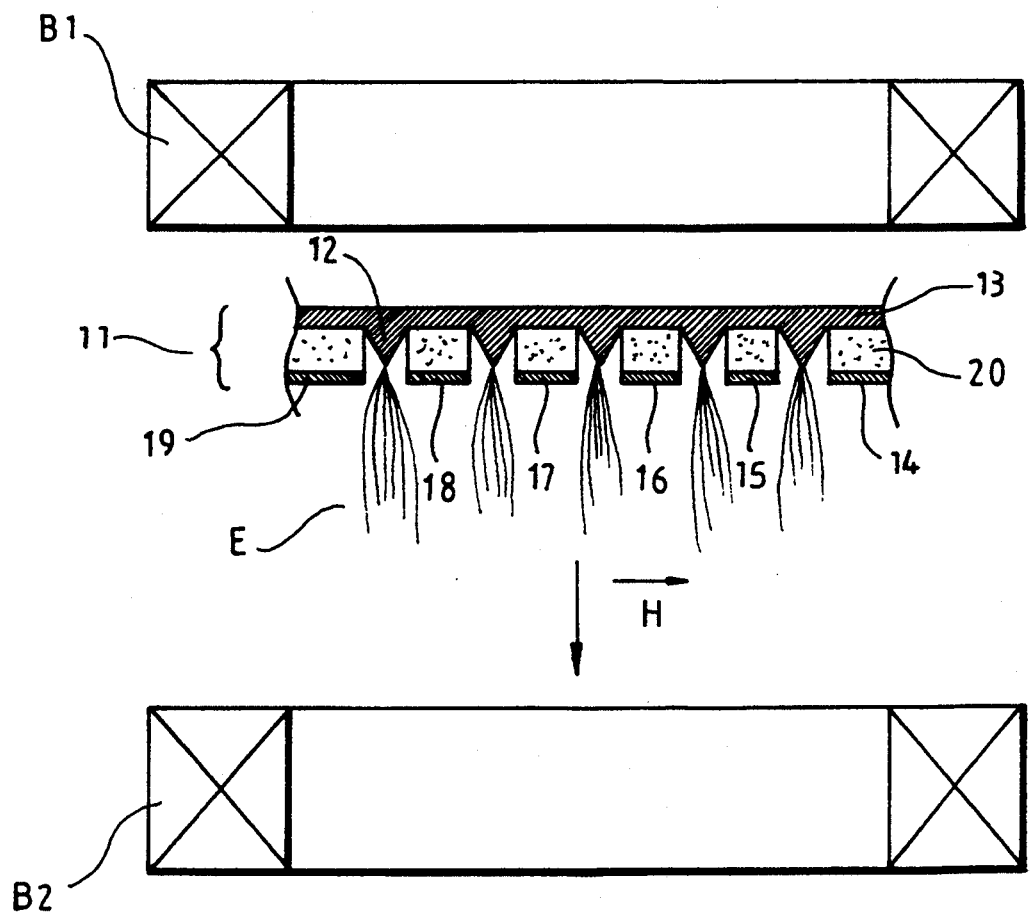
FIG. 4 is a view in section of a device that makes it possible to demetallize the films according to another embodiment of the invention.

FIG. 4 is a view in section of a device making it possible to demetallize the films according to an embodiment using an electron beam. A micropoint cathode fragment 11 is shown in section in FIG. 4.

All the micropoints 12 are placed on the same cathode 13. An anode, represented in FIG. 4 by metallizations 14, 15, 16, 17, 18 and 19, is placed on a dielectric 20 parallel to this cathode. Although it does not appear in this figure, metallizations 14, 15, 16, 17, 18 and 19 are all connected to one another.

A potential difference on the order of 10 kilovolts is continuously applied between the cathode and the anode so as to apply to the electrons to be removed from the cathode a level of energy favorable to this removal. It is enough then to apply an additional potential difference on the order of 70 volts between cathode and anode so that there is emission of electrons. The emission of electrons is discontinuous. Thus the additional potential difference is applied in the form of pulses.

The electrons thus emitted are accelerated by magnetic field H created by coils B1 and B2 so as to constitute a beam E.

Figure 5:
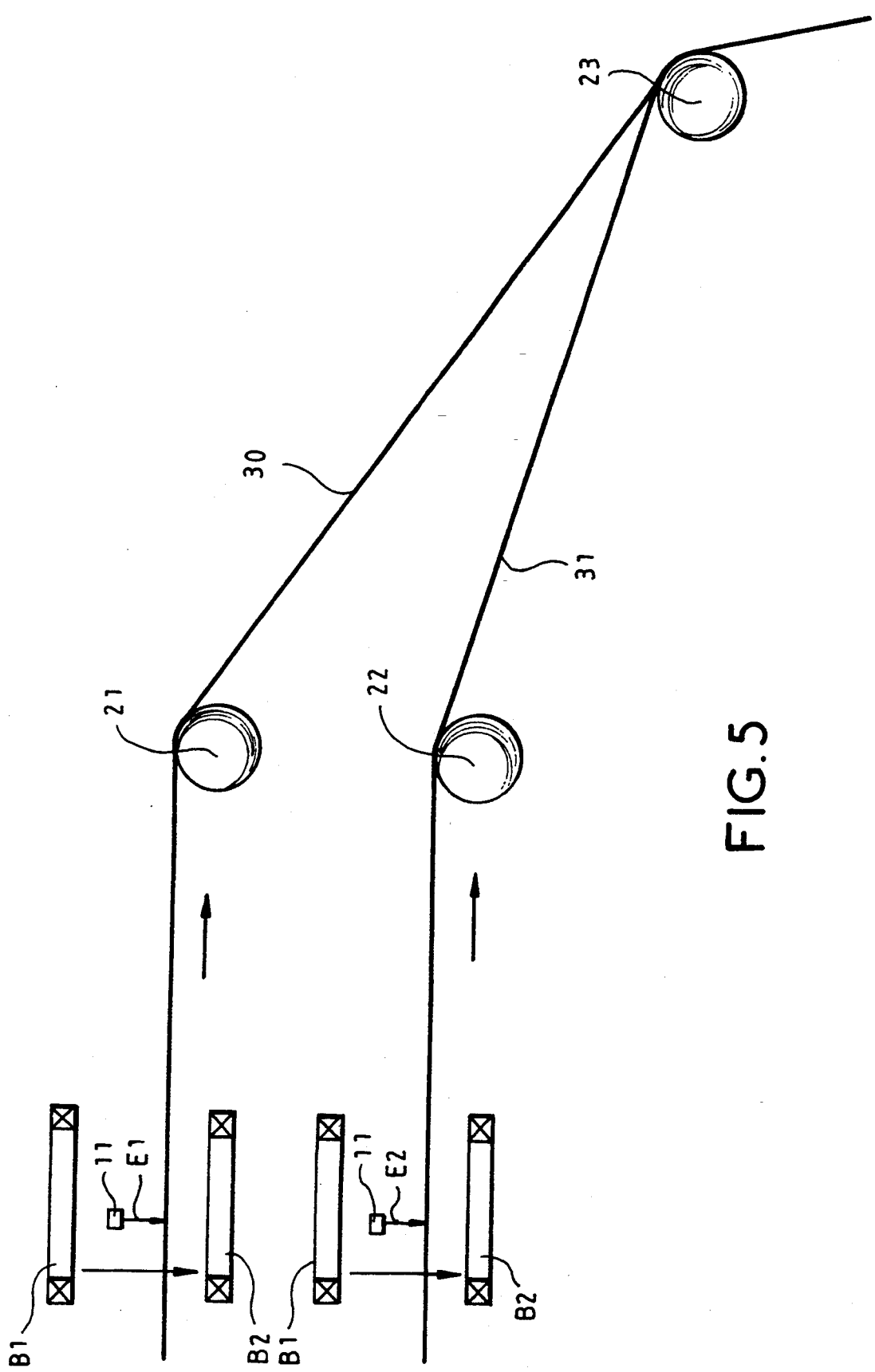
FIG. 5 shows the demetallization operation of two metallized plastic films during the step of winding of the films using the device described in FIG. 4.

FIG. 5 shows the demetallization operation of two metallized plastic films during the winding step of the films using the device described in FIG. 4.

Referring to FIG. 5, a first metallized plastic film 30 is superposed on a second metallized plastic film 31 via the system of rollers 21, 22, 23.

An electron beam E1, coming from a device such as the one described in FIG. 4, is sent to film 30 while an electron beam E2, coming from a device identical with the preceding one, is sent to film 31.

From a mechanical viewpoint, the etching is optimal when the electron beam is sent to the films on the side of the dielectric and causes the separation and peeling of the metal layer to produce transparency.

The etching by electron beam is applied under the same conditions as the etching by laser beam. Therefore, it makes it possible to make the nonmetallized lateral portions, making it possible to define the value of the capacitance and the demetallizations of the finishing turns.

On the other hand, the etching by electron beam exhibits the same advantages as the etching by laser beam with regard to the definition of the portions obtained, with a line precision on the order of a micron.

More generally, the demetallization by etching can be performed to demetallize the plastic films regardless of the step during which this demetallization is to occur.

Thus, for example, the plastic films can be demetallized by the process according to the invention before the cutting of the widths of great width into elementary ribbons.

Obviously, numerous modifications and variations of the present invention are possible in light of the above teachings. It is therefore to be understood that, within the scope of the appended claims, the invention may be practiced otherwise than as specifically described herein.

What is claimed an new and desired to be secured by Letters Patent of the United States is:

1. Process for producing laminated capacitors by winding at least one pair of metallized plastic films, said winding comprising:
   a first step of winding finishing turns while demetallizing portions of the films so that the superposed films do not produce any capacitance in the final component;
   a second step of winding which superposes the films so that the superposed films contribute to the capacitance of the final component while demetallizing the films at lateral portions thereof; and
   a third step of winding finishing turns under the same conditions as during the first step, wherein the demetallization steps are performed by etching.

2. Process according to claim 1, wherein the etching steps are performed with a laser beam.

3. Process according to claim 2, wherein the laser operation is identical for each of the three winding steps and said laser is pulsed.

4. Process according to claim 1, wherein the etching steps are performed with at least two networks of micropoint cathodes.

5. Process according to claim 1, wherein, during the first and third steps, the films are wound so as to superpose the portions demetallized by etching.

6. Process for producing laminated capacitors comprising:
   at least one step of demetallization of metallized plastic films appearing in the form of widths of great width, wherein the at least one demetallization step is performed by etching; and
   cutting the films into ribbons.

7. Process according to claim 6, wherein the etching is performed with a laser beam.

8. Process according to claim 6, wherein the etching is performed with at least one network of micropoint cathodes.

* * * * *

UNITED STATES PATENT AND TRADEMARK OFFICE
CERTIFICATE OF CORRECTION

PATENT NO. : 5,384,005
DATED : January 24, 1995
INVENTOR(S) : Nicolas CHAPAS, et al.

It is certified that error appears in the above-indentified patent and that said Letters Patent is hereby corrected as shown below:

On the title page, Item [63], the Related U.S. Application Data should read:

--Continuation of Ser. No. 22,313, Feb. 25, 1993, abandoned.--

Signed and Sealed this

Twenty-fifth Day of April, 1995

Attest:

BRUCE LEHMAN

*Attesting Officer*           *Commissioner of Patents and Trademarks*